(12) United States Patent
Lubbers et al.

(10) Patent No.: US 8,363,519 B2
(45) Date of Patent: Jan. 29, 2013

(54) HOT DATA ZONES

(75) Inventors: Clark E. Lubbers, Colorado Springs, CO (US); Michael D. Walker, Colorado Springs, CO (US); Randy L. Roberson, New Port Richey, FL (US)

(73) Assignee: Seagate Technology LLC, Scotts Valley, CA (US)

(*) Notice: Subject to any disclaimer, the term of this patent is extended or adjusted under 35 U.S.C. 154(b) by 1580 days.

(21) Appl. No.: 11/479,416

(22) Filed: Jun. 30, 2006

(65) Prior Publication Data

US 2008/0005475 A1  Jan. 3, 2008

(51) Int. Cl.
G11B 7/00 (2006.01)

(52) U.S. Cl. ............... 369/47.1; 369/47.32; 369/30.38; 360/55

(58) Field of Classification Search ............... 369/47.1, 369/30.07, 53.17, 275.3; 711/202, 133
See application file for complete search history.

(56) References Cited

U.S. PATENT DOCUMENTS

| | | | |
|---|---|---|---|
| 5,428,758 A | 6/1995 | Salsburg | |
| 5,539,711 A * | 7/1996 | Mitani | 369/178.01 |
| 5,664,187 A | 9/1997 | Burkes et al. | |
| 5,761,526 A | 6/1998 | Sakakura et al. | |
| 5,765,204 A * | 6/1998 | Bakke et al. | 711/202 |
| 6,314,503 B1 | 11/2001 | D'Errico et al. | |
| 6,353,332 B1 | 3/2002 | Brelet | |
| 6,397,293 B2 | 5/2002 | Shrader et al. | |
| 6,507,893 B2 * | 1/2003 | Dawkins et al. | 711/133 |
| 6,671,766 B1 | 12/2003 | Vandenbergh et al. | |
| 6,738,865 B1 | 5/2004 | Burton et al. | |
| 6,789,163 B2 | 9/2004 | Fox et al. | |
| 6,813,693 B2 | 11/2004 | Chilimbi | |
| 6,868,439 B2 | 3/2005 | Basu et al. | |
| 6,928,518 B2 | 8/2005 | Talagala | |
| 6,971,092 B1 | 11/2005 | Chilimbi | |
| 6,973,503 B2 | 12/2005 | Basso et al. | |
| 6,978,325 B2 | 12/2005 | Gibble et al. | |
| 7,059,936 B2 | 6/2006 | Prasad | |
| 2002/0078303 A1 | 6/2002 | Rozario et al. | |
| 2002/0095546 A1 | 7/2002 | Dimitri et al. | |
| 2004/0024971 A1 | 2/2004 | Bogin et al. | |
| 2004/0205297 A1 | 10/2004 | Bearden | |
| 2004/0255083 A1 | 12/2004 | Chilimbi | |
| 2007/0300035 A1 | 12/2007 | Brewer et al. | |

* cited by examiner

*Primary Examiner* — Muhammad N Edun
(74) *Attorney, Agent, or Firm* — Hall Estill, et al.

(57) ABSTRACT

Method and apparatus for adaptive arrangement of data on storage media, such as in a multi-device storage array across which data are stored. A virtual hot space is formed to store frequently accessed data. The virtual hot space comprises at least one hot data zone which extends across storage media of a plurality of arrayed storage devices over a selected seek range less than an overall radial width of the media. The frequently accessed data are stored to the hot data zone(s) in response to a host level request, such as from a host level operating system (OS) or by a user which identifies the data as frequently accessed data. Alternatively or additionally, access statistics are accumulated and frequently accessed data are migrated to the hot data zone(s) in relation thereto. Lower accessed data sets are further preferably migrated from the hot data zone(s) to another location of the media.

20 Claims, 5 Drawing Sheets

HOT DATA ZONES

FIELD OF THE INVENTION

The claimed invention relates generally to the field of data storage systems and more particularly, but not by way of limitation, to a method and apparatus directed to the adaptive arrangement of frequently accessed data sets in hot data zones in a storage array.

BACKGROUND

Storage devices are used to access data in a fast and efficient manner. Some types of storage devices use rotatable storage media, along with one or more data transducers that write data to and subsequently read data from tracks defined on the media surfaces.

Multi-device arrays (MDAs) can employ multiple storage devices to form a consolidated memory space. One commonly employed format for an MDA utilizes a RAID (redundant array of independent discs) configuration, wherein input data are stored across multiple storage devices in the array. Depending on the RAID level, various techniques including mirroring, striping and parity code generation can be employed to enhance the integrity of the stored data.

With continued demands for ever increased levels of storage capacity and performance, there remains an ongoing need for improvements in the manner in which storage devices in such arrays are operationally managed. It is to these and other improvements that preferred embodiments of the present invention are generally directed.

SUMMARY OF THE INVENTION

Preferred embodiments of the present invention are generally directed to an apparatus and method for adaptively arranging data on a storage medium, such as in a multi-device storage array.

In accordance with preferred embodiments, a storage manager forms a virtual hot space to store frequently accessed data. The virtual hot space comprises at least one hot data zone which extends across storage media of a plurality of arrayed storage devices over a selected seek range less than an overall radial width of the media.

The storage manager further preferably stores such frequently accessed data to the hot data zone(s) in response to a host level request, such as from a host level operating system (OS) or by a user which identifies the data as frequently accessed data.

Alternatively or additionally, the storage manager preferably accumulates access statistics and migrates frequently accessed data from other locations of the media to the hot data zone(s) in relation to such statistics. The storage manager further preferably migrates lower accessed data sets from the hot data zone(s) to other locations of the media. The virtual hot space can further include multiple gradations of zones, such as a hot zone to store hot data and a warm zone to store warm data.

In this way, frequently accessed data are preferably accumulated to selected, reduced seek ranges across the devices, resulting in improved data transfer performance.

These and various other features and advantages which characterize the claimed invention will become apparent upon reading the following detailed description and upon reviewing the associated drawings.

DETAILED DESCRIPTION

Figure 1:
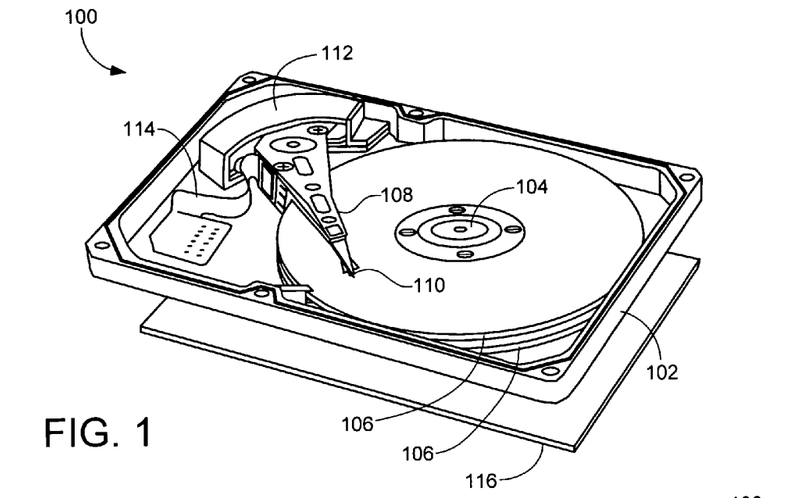
FIG. 1 generally illustrates a storage device constructed and operated in accordance with preferred embodiments of the present invention.

FIG. 1 shows an exemplary storage device 100 configured to store and retrieve user data. The device 100 is preferably characterized as a hard disc drive, although other device configurations can be readily employed as desired.

A base deck 102 mates with a top cover (not shown) to form an enclosed housing. A spindle motor 104 is mounted within the housing to controllably rotate media 106, preferably characterized as magnetic recording discs.

A controllably moveable actuator 108 moves an array of read/write transducers 110 adjacent tracks defined on the media surfaces through application of current to a voice coil motor (VCM) 112. A flex circuit assembly 114 provides electrical communication paths between the actuator 108 and device control electronics on an externally mounted printed circuit board (PCB) 116.

Figure 2:
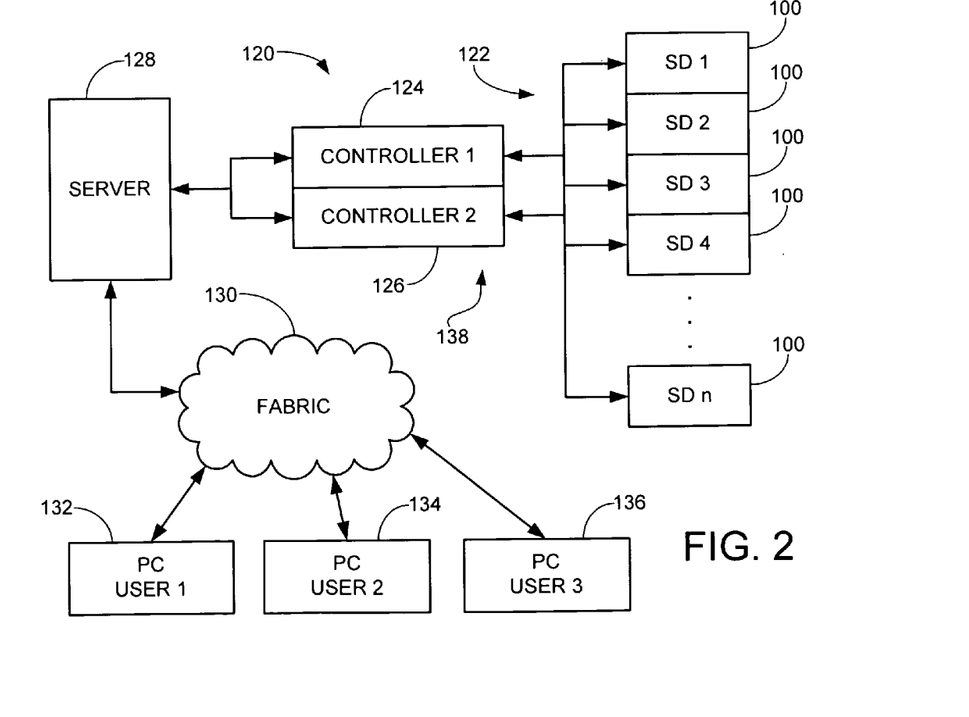
FIG. 2 is a functional block diagram of a network system which utilizes a number of storage devices such as illustrated in FIG. 1.

FIG. 2 generally illustrates an exemplary network system 120 that advantageously incorporates a number n of the storage devices (SD) 100 to form a consolidated storage space 122. Redundant controllers 124, 126 preferably operate to transfer data between the storage space 122 and a server 128. The server 128 in turn is connected to a fabric 130, such as a local area network (LAN), the Internet, etc.

Remote users respectively access the fabric 130 via personal computers (PCs) 132, 134, 136. In this way, a selected user can access the storage space 122 to write or retrieve data as desired.

Figure 3:
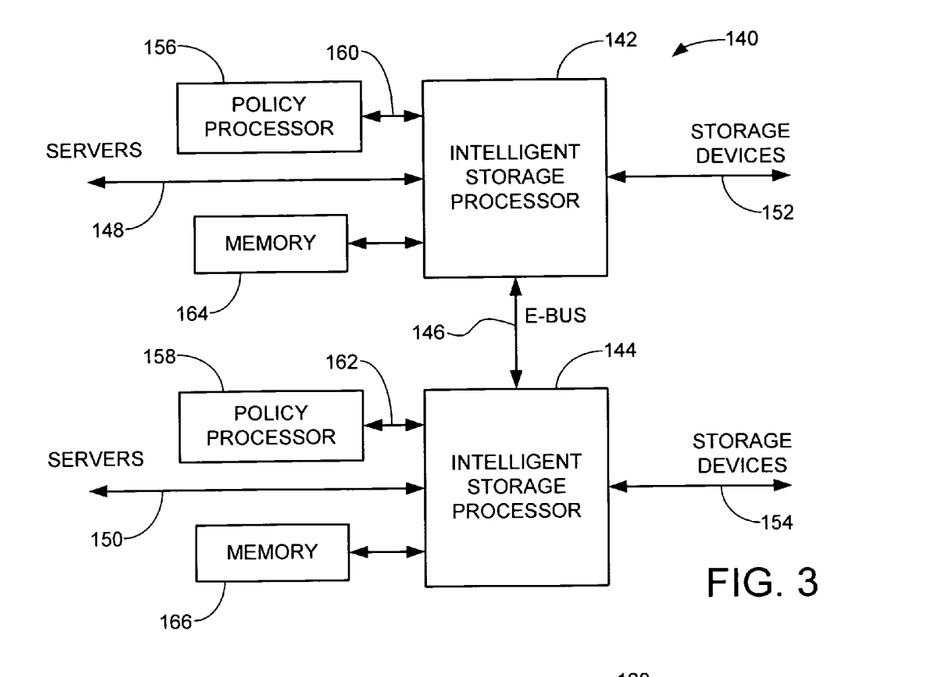
FIG. 3 provides a general representation of a preferred architecture of the controllers of FIG. 2.

The devices 100 and the controllers 124, 126 are preferably incorporated into a multi-device array (MDA). The MDA preferably uses one or more selected RAID (redundant array of independent discs) configurations to store data across the devices 100. Although only one MDA and three remote users are illustrated in FIG. 2, it will be appreciated that this is merely for purposes of illustration and is not limiting; as desired, the network system 120 can utilize any number and types of MDAs, servers, client and host devices, fabric configurations and protocols, etc. FIG. 3 shows an array controller configuration 140 such as useful in the network of FIG. 2.

FIG. 3 sets forth two intelligent storage processors (ISPs) 142, 144 coupled by an intermediate bus 146 (referred to as an "E BUS"). Each of the ISPs 142, 144 is preferably disposed in a separate integrated circuit package on a common controller board. Preferably, the ISPs 142, 144 each respectively communicate with upstream application servers via fibre channel server links 148, 150, and with the storage devices 100 via fibre channel storage links 152, 154.

Policy processors 156, 158 execute a real-time operating system (RTOS) for the controller 140 and communicate with the respective ISPs 142, 144 via PCI busses 160, 162. The policy processors 156, 158 can further execute customized logic to perform sophisticated processing tasks in conjunction with the ISPs 142, 144 for a given storage application. The ISPs 142, 144 and the policy processors 156, 158 access memory modules 164, 166 as required during operation.

Figure 4:
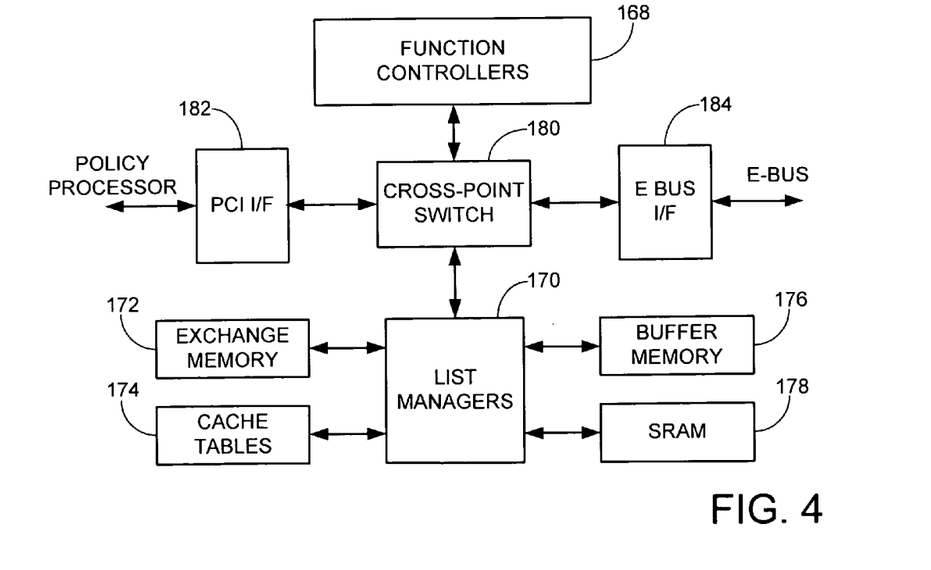
FIG. 4 provides a functional block diagram of a selected intelligent storage processor of FIG. 3.

FIG. 4 provides a preferred construction for a selected ISP of FIG. 3. A number of function controllers, collectively identified at 168, serve as function controller cores (FCCs) for a number of controller operations such as host exchange, direct memory access (DMA), exclusive-or (XOR), command routing, metadata control, and disc exchange. Each FCC preferably contains a highly flexible feature set and interface to facilitate memory exchanges and other scheduling tasks.

A number of list managers, denoted generally at 170 are used for various data and memory management tasks during controller operation, such as cache table management, metadata maintenance, and buffer management. The list managers 170 preferably perform well-defined albeit simple operations on memory to accomplish tasks as directed by the FCCs 168. Each list manager preferably operates as a message processor for memory access by the FCCs, and preferably executes operations defined by received messages in accordance with a defined protocol.

The list managers 170 respectively communicate with and control a number of memory modules including an exchange memory block 172, a cache tables block 174, buffer memory block 176 and SRAM 178. The function controllers 168 and the list managers 170 respectively communicate via a cross-point switch (CPS) module 180. In this way, a selected function core of controllers 168 can establish a communication pathway through the CPS 180 to a corresponding list manager 170 to communicate a status, access a memory module, or invoke a desired ISP operation.

Similarly, a selected list manager 170 can communicate responses back to the function controllers 168 via the CPS 180. Although not shown, separate data bus connections are preferably established between respective elements of FIG. 4 to accommodate data transfers therebetween. As will be appreciated, other configurations can readily be utilized as desired.

FIG. 4 further shows a PCI interface (I/F) module 182 which establishes and directs transactions between the policy processor 156 and the ISP 142. An E-BUS I/F module 184 facilitates communications over the E-BUS 146 between FCCs and list managers of the respective ISPs 142, 144. The policy processors 156, 158 can also initiate and receive communications with other parts of the system via the E-BUS 146 as desired.

The controller architecture of FIGS. 3 and 4 advantageously provides scalable, highly functional data management and control for the array. Preferably, stripe buffer lists (SBLs) and other metadata structures are aligned to stripe boundaries on the storage media and reference data buffers in cache that are dedicated to storing the data associated with a disk stripe during a storage transaction.

To further enhance processing efficiency, a novel storage management methodology is preferably employed by the controllers 124, 126 with regard to "hot data." The term hot data generally refers to data stored within the storage array 122 for which data accesses (reads and/or writes) are carried out on a relatively frequent basis; that is, data for which there is a relatively high level of host interest as compared to other, "non-hot" data.

Conventional data management techniques generally dictate that hot data should be balanced or otherwise separated and distributed across different locations within the storage array, to reduce the frequency of hits to any particular area.

By contrast, preferred embodiments of the present invention generally operate to form a virtual hot space to store hot data. The virtual hot space generally comprises one or more hot data zones each of which extends across a storage media surface in each device of a plurality of arrayed storage devices over a selected seek range less than an overall radial width of said media surfaces.

The hot data are preferably migrated to the hot data zone(s) in response to host level requests to designate certain data as hot data, such as at a host operating system (OS) level through file reference statistics, or through user identification of certain data as hot data such as by a network administrator. Alternatively or additionally, the migration is preferably carried out by the system adaptively identifying data as hot data over time in response to accumulated access statistics, and then moving such hot data from another location of the media to the hot data zone(s).

Infrequently referenced data sets within the hot data zones are further preferably migrated out of these zones to other areas of the media. In this way, the hot data zones accumulate and maintain higher interest data sets, leading to an intentional concentration of media accesses to these areas.

Figure 5:
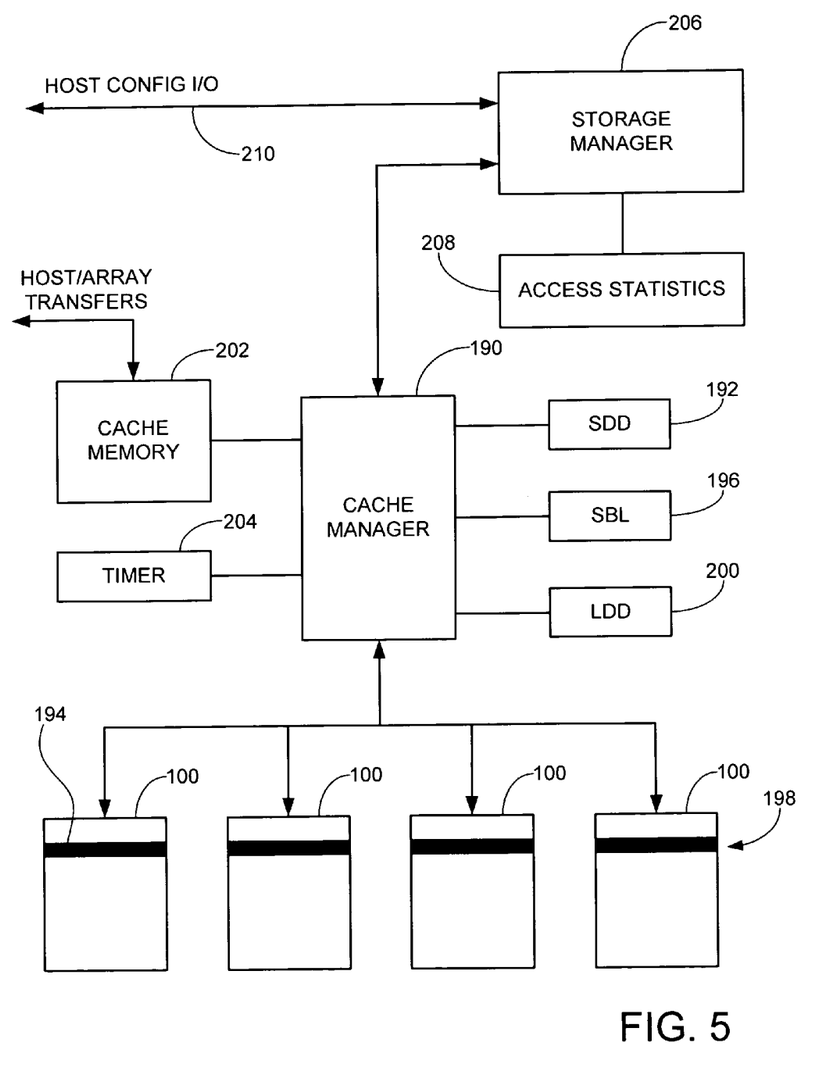
FIG. 5 is a functional block diagram of a storage manager of the controller architecture of FIGS. 3 and 4 configured to operate in accordance with preferred embodiments of the present invention.

As shown in FIG. 5, cached data are preferably managed on a node basis by a cache manager (CM) 190 using a data structure referred to as a stripe data descriptor (SDD) 192. Each SDD holds data concerning recent and current accesses to the data with which it is associated. Each SDD preferably aligns to a corresponding RAID stripe 194 (i.e., all of the data on a selected device 100 associated with a particular parity set), and conforms to a particular SBL 196.

Each cache node managed by the CM 190 preferably references some particular SDD, with active SDD structures for a given set of logical discs (subset of the devices 100) being preferably linked in ascending order via a virtual block address (VBA) using a standard forward and backward linked list.

Preferably, the VBA values are aligned with the RAID data organization using a grid system sometimes referred to as a RAID Allocation Grid System (RAGS). Generally, any particular collection of blocks belonging to the same RAID strip 198 (e.g., all of the data contributing to a particular parity set) will be assigned to a particular reliable storage unit (RSU) on a particular sheet.

A book consists of a number of sheets and is constructed from multiple contiguous sets of blocks from different devices 100. Based on the actual sheet and VBA numbers, the books can be further sub-divided into zones, indicating the particular device or device set (when redundancy is employed).

Each SDD 192 preferably includes variables (parameters) that indicate various states of the data. SDD variables that are preferably utilized in accordance with preferred embodiments include access history, last offset, last block, timestamp data (time of day, TOD), RAID level employed, stream parameters, and speculative data status.

The access history of the SDD 192 preferably provide a relative measure of a rate at which accesses are made to the data associated with the SDD. For example, an accesses variable can be an incremental count that is updated upon each access to the data defined by the SDD. The accesses variable thus provides an indication of host interest in the data in this locality; under normal circumstances, a higher existing number of accesses might produce a higher likelihood that more accesses will occur in the near future.

The TOD variable generally provides an indication of elapsed time since the most recent access. By subtracting the TOD variable from the current time, an aging assessment can be made on how frequently (or infrequently) the SDD is being accessed.

The stream parameters generally provide stream count and stream size values relating to successively issued requests for data from the storage array that fall into a concurrent sequence (a "stream"). When a request just follows a previous request as determined by the VBA matching the previous last VBA based on the last offset and last block values, the stream count is incremented and the stream size is adjusted to match the new overall range. The speculative data status value generally identifies the associated data ranges of speculatively retrieved data within a stream.

A logical disk descriptor (LDD) 200 preferably provides data on a logical disc basis, which can span several adjacent SDDs in the virtual space created on the media 106 of a given set of grouped devices 100.

Preferably, during normal operations the cache manager 190 operates to service host read and write operations to transfer data between the storage devices 100 and an associated host (e.g., PCs 132, 134, 136). During a read operation, if a cache hit can not be made, the requested data are retrieved from the media 106 to cache memory 202 for subsequent transfer to the host. Speculative non-requested data may also be retrieved and retained in the cache memory as desired.

During write operations, writeback data from the associated host are stored in the cache memory 202 and a command complete status is communicated to the host to free the host to continue with additional processing. The CM 190 then schedules the writing of the cached writeback data to the appropriate locations on the media 106 of the storage devices 100 at a later time.

A timer 204 preferably characterized as a free running counter provides timing information to assess aging of the various cached requested and speculative readback data, as well as the aging of the cached writeback data.

A storage manager 206 operates in conjunction with the cache manager 190 to assess access history trends. The storage manager 206 can be implemented in hardware or software as desired, such as part of the FCCs 168 or policy processors 156, 158. The storage manager 206 generally serves as a monitoring routine to track access activity with the devices 100. Access statistics are preferably accumulated for a selected period of time, as represented at block 208. The storage manager 206 can further operate in response to configuration inputs supplied by a host, such as a host application or operating system, via communication path 210.

Generally, the storage manager 206 operates to migrate data within the array to different locations to improve operational efficiencies. This will be explained in greater detail with reference to FIG. 6, which provides a selected surface of the media 106 (FIG. 1) of a selected device 100.

Figure 6:
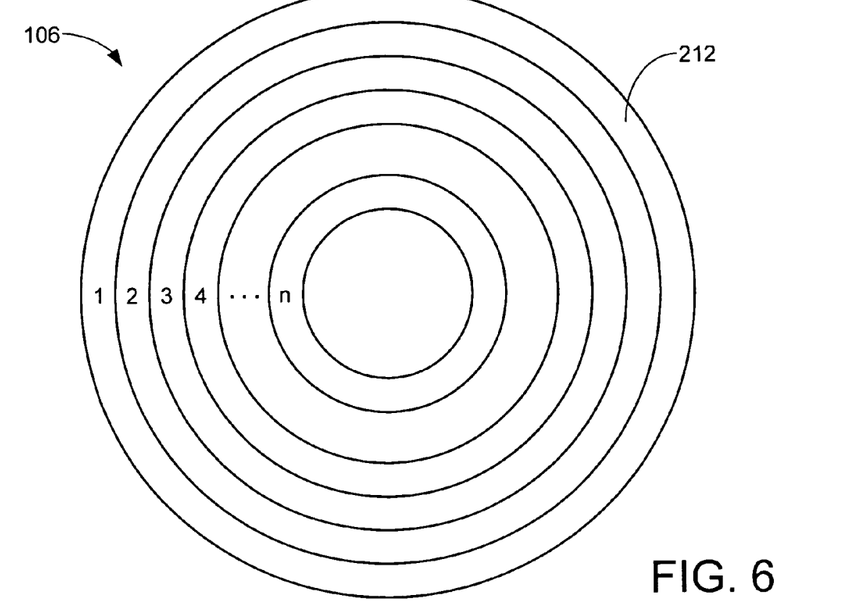
FIG. 6 illustrates a hot data zone of a selected storage medium of the storage array in accordance with preferred embodiments.

The media surface is divided into radially concentric logical groups 212. The groups 212, also referred to herein as zones, are denoted 1 to n from an outermost diameter (OD) to an innermost diameter (ID) of the media 106 in each of the associated devices 100. Preferably, the zones correspond to selected cylinders (e.g., the respective blocks axially aligned on multiple adjacent media surfaces), although such is not necessarily required.

Each zone 212 comprises a selected number of tracks on which sectors (logical blocks) of selected size are formed (e.g., 512 bytes, 4096 bytes, etc.). The zones 212 can all have a common maximum data capacity, or can have different respective data capacities. The zones 212 each thus represent a contiguous, selected seek range for the associated transducer 110 on each of the respective media surfaces of each of the devices 100.

Each zone 212 in FIG. 6 can comprise a range of sheets of a book, an entire book, or multiple books formed from adjacent drive segments in accordance with the aforementioned RAGS implementation. The zone thus preferably extends across a number m of logically grouped devices 100. Thus, reference to "book 1" data will be understood to comprise the data in zone 1 in FIG. 6, as well as similarly placed zones on storage media 106 of other devices 100 in the array.

Figure 7:
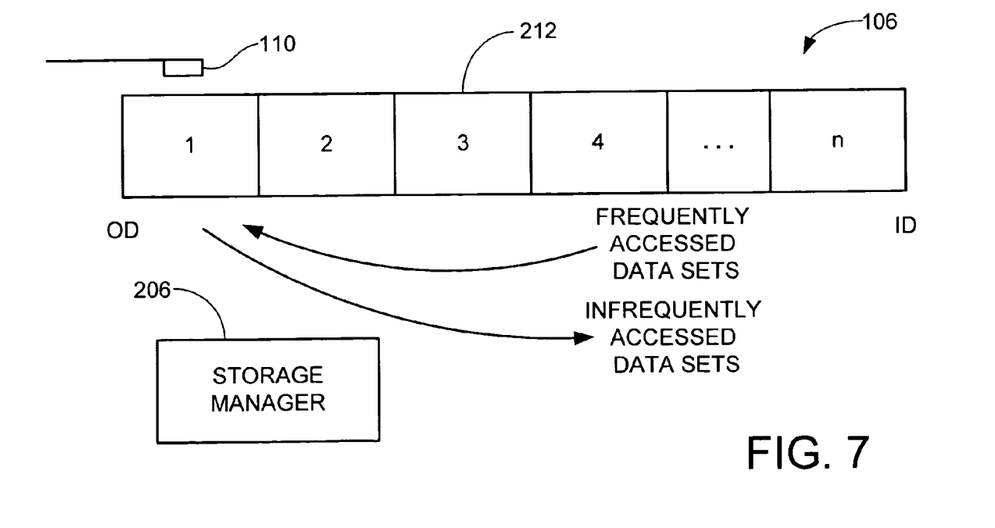
FIG. 7 provides another representation of the hot data zone of FIG. 6.

As further shown in FIG. 7, the storage manager 206 operates to detect data sets with a relatively high access rate and to migrate these hot data sets to one or more hot books, such as book 1. Location of the hot book proximate the ODs of the underlying devices 100 is preferred, but not required. Such transfers will preferably take place in the background as scheduled by the cache manager 190 in conjunction with other ongoing processing.

Under normal operational loading, it is contemplated that certain types of data will be requested on a substantially higher access rate basis than other types of data, such as in accordance with the well-known 80-20 Pareto Rule (i.e., around 80% of the accesses may be for only about 20% of the data). With suitable parametric selections, the hot books can be selected from consecutive LBA ranges with highly concentrated seek ranges with respect to the overall width of the media, such as ⅛ of the overall media width. Thus, by placing this highly accessed data within a reduced seek range such as book 1 in FIGS. 6 and 7, large seek latencies will be reduced and overall host transfer rates can be substantially increased (e.g., doubled or more).

Preferably, the hot books are set up to confine accesses to a portion of the media surfaces, such as $\frac{1}{8}^{th}$, $\frac{1}{4}^{th}$, $\frac{3}{8}^{th}$, etc. In some preferred embodiments, system administrators or other personnel can designate certain types of highly referenced data to be specifically "earmarked" for the hot book(s). A system operating system (OS) can also be configured to use on-demand sparse allocation techniques to specifically place frequently referenced data to the hot book(s).

The storage manager 206 further preferably performs statistical analyses or other empirical analyses of the access statistics from block 208 accumulated during operation. When a data set is identified as a candidate for migration to the hot books, if stored elsewhere on the media 106, the storage manager 206 schedules the appropriate movement of the associated data to the hot books (e.g., from some other non-hot book to book 1).

The data moved can be any suitable set or sets of data. The data can be migrated in fixed sized blocks, such as 8 MB (64 SDDs), or different sized blocks can be migrated at different times. In some preferred embodiments, the moved data is provided with a selected RAID configuration, and this configuration remains unchanged after the migration. Alternatively, new RAID configurations can be applied to the units of data that are moved upon migration. Suitable thresholds can be established and adaptively adjusted as required to aid in the designation of data as candidates for movement to the hot book(s).

Similarly, the access statistics further preferably maintain a history of accesses to the hot data once stored in the hot book(s). In this way, if a certain data set has not been accessed at a level sufficient to continue the designation thereof as hot data, the CM 190 can be instructed to schedule a move of such data out of the hot zone to another location on the media 106.

The decision to move selected sets of infrequently accessed data out of the hot data zone can take into account the manner in which the data were first designated as hot data; for example, data migrated in response to the access statistics are preferably more likely to be subsequently moved out as compared to data designated as hot at the host level.

Of course, host level designations can also be specifically made to declassify formerly hot data as non-hot data, in which case the storage manager 206 operates to schedule the subsequent migration of the formerly hot data out of the hot data zone. The system can also be configured to provide indications to the host that data identified at the host level as hot data are being infrequently accessed, along with a request for permission from the host to migrate said data out of the hot data zone.

Preferably, the data storage capacity of the hot book zones 212 is larger than the associated allocatable cache memory 202; that is, it is contemplated that there will be more hot data than can be continuously maintained in the cache memory, and the amount of hot data will be larger than the associated cache capacity. This is not a problem, however; if cache hits are not available for a given set of requested data, disc I/O accesses will take place as before. The physical proximity of the hot data on the media 106, however, will generally operate to advantageously reduce seek latencies in servicing such requests.

The cache manager 190 preferably operates in a conventional fashion to carry out cache management and retention policies to handle on-going transfers, with the addition that readback data from (or to) a hot zone may be retained in cache longer than data to the remaining zones, or retained due to fewer accesses, all other factors being equal.

Moreover, the storage manager 206 is preferably further adapted to operate in conjunction with the cache manager 190 to give priority to accesses associated with the hot book(s), on the basis that such data have been deemed to exhibit a higher presumed priority as compared to data in other books. Thus, as the cache manager 190 operates to set up and service a command queue for data transfers with the devices 100, a weighting can be applied to commands associated with the hot books. Using the aforementioned 80-20 example, if about 20% of the data stored in the array 122 is deemed to represent hot data, then the cache manager 190 will preferably be configured to spend roughly about 80% of the time servicing data transfers to the hot book zones, and about 20% of the time servicing transfers to the remaining zones.

Figure 8:
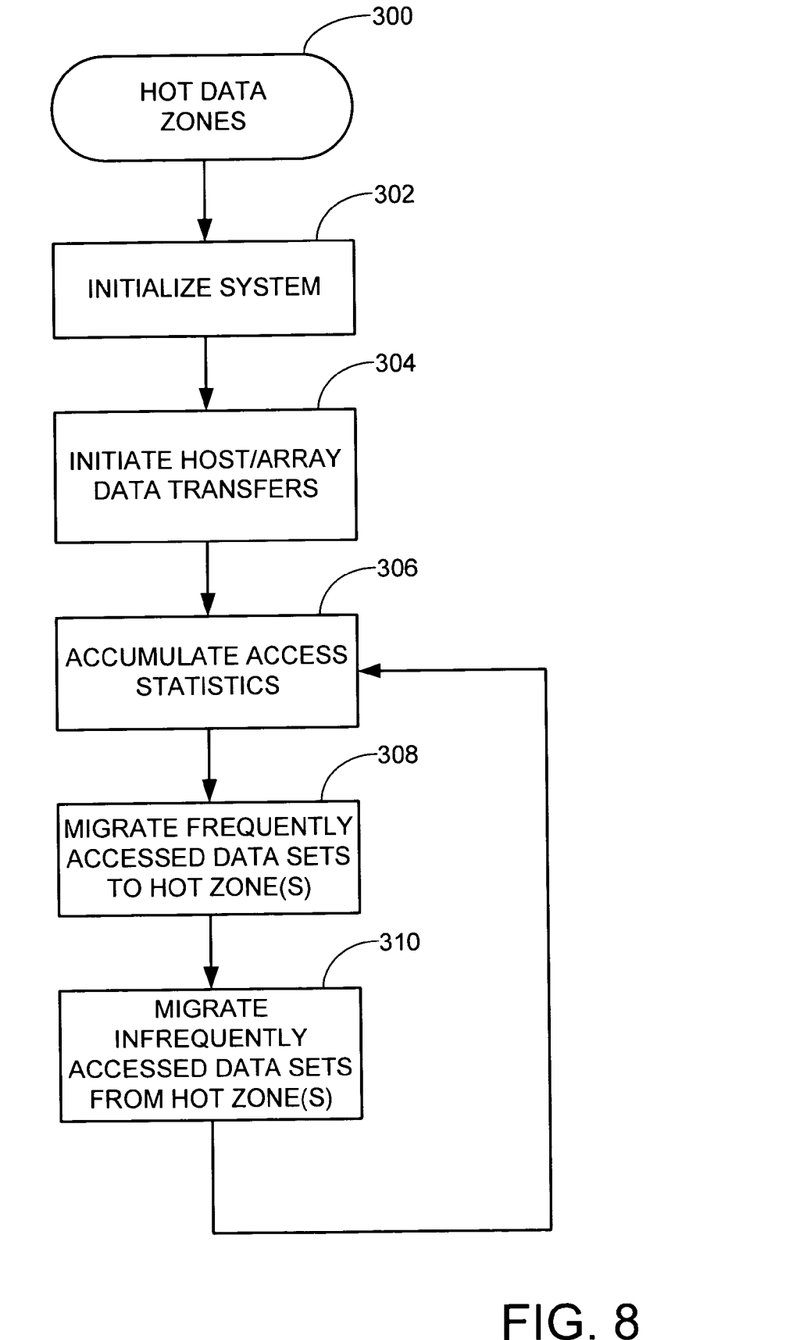
FIG. 8 is a flow chart for a HOT DATA ZONES routine, representative of steps carried out in accordance with preferred embodiments.

FIG. 8 sets forth a HOT DATA ZONES routine 300, generally illustrative of steps carried out in accordance with preferred embodiments of the present invention.

The system is initially configured at step 302. Preferably, this will include preparation for the system to accept and service data transfer requests, as well as to load other parameters such as the previously accumulated access statistics for the storage manager 206. If hot zones have not already been designated and populated with hot data, then this step can include initial designation of the virtual hot space to which hot data are to be accumulated, with the virtual hot space identified as the corresponding hot zone(s) on the storage media on each of the associated devices 100 with the selected seek range as discussed above.

Normal system operation commences at step 304, which will preferably include the servicing of host/array data transfers. As described above, this preferably includes read data requests from a selected host to transfer selected data sets from the devices 100 to the host, as well as writeback data requests to write data to the devices 100. Access history statistics are preferably accumulated on an on-going basis during these operations at step 306.

Hot data are periodically migrated to the hot data zone(s) at step 308. This preferably occurs as described above through host level requests (such as at the OS level or by user designation), or through the ongoing analysis and ranking of data accesses by the storage manager 206. At step 310, data that have previously been denoted as hot data continue to be monitored by the storage manager 206 and, as required, migrated away from the hot data zones to other non-hot zones on the media 106.

In this way, the system is highly adaptive to changes in operational loading requirements, and can be readily scalable by applications or user input. Much of the operation of the hot data zone methodology can be transparent to the user, while providing significantly improved, sustained I/O rates.

An advantage of the various preferred approaches discussed herein is that, generally, hot data are generally guaranteed to be within a selected, reduced seek range on each of the associated media surfaces of the associated storage devices 100, which will tend to significantly improve transfer performance for such data in response to random read and write operations with such data. The approach can readily be used in accordance with the aforementioned RAGS implementation, as well as with other implementations including formula RAID.

While preferred embodiments presented herein have placed the hot data zone(s) adjacent the ODs of the media of the associated storage devices 100, it will be apparent that such is not required; that is, the virtual hot space can be mapped to any suitable band on the media including near the IDs. The hot zone can further vary in radial location from device to device if so desired In further preferred embodiments, multiple gradients of "hotness" are assigned to the virtual hot space. For example, some data can be designated as "hot" and stored to a first zone (e.g., zone 1 in FIG. 6) across the associated devices. Other data can be adjudged as "warm," meaning that the frequency of access might not be quite as high as the hot data, but it still may be desirable to improve data transfer performance for such data.

In such case, a second zone (e.g., zones 2 and 3 in FIG. 6) preferably adjacent the hot zone is formed to accommodate the warm data. The remaining data can be classified as "cold" data, meaning that the data are referenced on a relatively infrequent basis as compared to the hot and warm data, and such data are preferably stored to a third zone (e.g., zones 4 through n in FIG. 6).

In this way, assuming n=8 for the present example, it follows that the hot data are stored in zone 1 (constituting substantially a $\frac{1}{8}$ seek range), the warm data are stored in zones 2-3 (constituting a $\frac{1}{4}$ seek range) and the cold data are stored in zones 4-8 (constituting a $\frac{5}{8}$ seek range). The virtual hot space thus guarantees that the transducers 110 will generally spend most of the time within a $\frac{3}{8}$ seek range of the respective media, with periodic excursions to the rest of the media surfaces to service the cold data. Further gradations are envisioned as well (e.g., "cold data," "warm data," "hot data," "hotter data," "hottest data") and can be readily implemented as desired.

The hot data zone(s) are preferably sized to provide sufficient storage capacity to handle a number of issues including sparing, RAID configurations and transformations, mirroring, etc. Nevertheless, it will be appreciated that in order to obtain the performance gains discussed above, the hot data on each storage device 100 are preferably limited to the selected, reduced seek range on each media surface.

While preferred embodiments presented herein have been directed to a multi-device array utilizing a plurality of disc drive data storage devices, it will be appreciated that such is merely for purposes of illustration and is not limiting. Rather, the claimed invention can be utilized in any number of various environments to promote efficient data handling.

For purposes of the appended claims, reference to a hot data zone which extends across a storage media surface in each device of a plurality of arrayed storage devices over a selected seek range less than an overall radial width of said media surfaces will be understood to cover as at least one media surface in each said device. While the hot data zone may be extended to multiple media surfaces in each device, such is not required. The term "migration" as used herein does not require that the data first be stored to another location of the media.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
    a storage array comprising a plurality of storage devices, each storage device comprising memory having an associated storage device memory capacity; and
    a storage manager coupled to the storage array and adapted to allocate a portion of the memory in each of the plurality of storage devices to form a multi-device hot data zone that extends across said plurality of storage devices, each said portion having a common maximum data capacity less than the associated storage device memory capacity, the storage manager subsequently storing a selected data set to the hot data zone responsive to a designation of said data set as hot data by storing a subset of the data set to each said portion.

2. The apparatus of claim 1, wherein the storage manager moves a data set characterized as a RAID strip of data stored across the plurality of storage devices to the hot data zone.

3. The apparatus of claim 1, wherein the hot data zone stores a data set previously denoted as hot data by a host device coupled to the storage manager, and wherein the storage manager monitors accesses to the data set and notifies the host in relation to said monitored accesses along with a request for permission to migrate said data set from the associated hot data zone to remaining portions of the associated memories of the plurality of storage devices.

4. The apparatus of claim 1, wherein the plurality of data storage devices each comprise an individual data storage device housing which encloses an associated rotatable data storage medium, and the hot data zone comprises a portion of a recording surface of each said rotatable data storage medium in each said device at a common radius thereof.

5. The apparatus of claim 1, in which the common maximum data capacity of each said allocated portion is about 20% of the overall storage device memory capacity of the associated data storage device.

6. The apparatus of claim 1, in which the storage array is characterized as a redundant array of inexpensive discs (RAID) and the storage manager is characterized as a RAID controller.

7. The apparatus of claim 1, in which the storage manager is incorporated into a controller having an associated local cache memory adapted to temporarily store data during a data transfer operation between the storage array and a host device, the local cache memory having an overall cache memory capacity less than a combined overall capacity of the hot data zone.

8. The apparatus of claim 7, in which the storage manager implements a cache retention policy to retain in the cache memory data associated with the hot data zone longer than data associated with other locations of the storage devices.

9. The apparatus of claim 1, in which the storage manager stores a selected data set to the hot data zone in response to a host level request to designate the selected data set as hot data.

10. The apparatus of claim 1, wherein the storage manager further accumulates access statistics for each of a plurality of data sets, identifies selected ones of said data sets as frequently accessed data in relation to said access statistics, and migrates the selected ones of said data sets identified as frequently accessed data to the hot data zone.

11. A method comprising:
    configuring a multi-device data storage array to store data from a host, the storage array comprising a plurality of independent storage devices each having a memory with an associated memory capacity;
    using a storage manager associated with the data storage array to allocate a portion of the memory from each of the plurality of storage devices to form a unified hot data zone that spans the storage devices;
    receiving a host request to designate a selected data set as having a relatively higher host interest as compared to other data stored by the storage devices; and
    storing the selected data set to the hot data zone responsive to the host request so that a subset of the selected data set is stored to each said portion of memory in each of the plurality of data storage devices.

12. The method of claim 11, in which the selected data set is characterized as a RAID strip of data formed from a plurality of equal sized RAID stripes, each of the RAID stripes being written to a different one of the portions of memory in the hot data zone.

13. The method of claim 11, in which each portion of memory making up the hot data zone comprises a contiguous data storage area in the associated storage device memory.

14. The method of claim 11, further comprising monitoring accesses to the selected data set stored in the hot data zone, and migrating said data set from the associated hot data zone to another memory location in the plurality of storage devices in relation to said monitored accesses.

15. The method of claim 14, further comprising, after the monitoring step and prior to the migrating step, steps of providing a request to the host for permission to migrate said data from the associated hot data zone to another location of the media, and receiving said permission from the host.

16. The method of claim 11, in which each allocated portion of the memory in each of the plurality of storage devices used to form the hot data zone has a common, overall memory capacity.

17. The method of claim 11, further comprising maintaining a data structure associated with the selected data set which accumulates a plurality of parameters including access history, RAID level employed, stream parameters, and speculative data status, wherein the storing step is further performed responsive to said data structure.

18. The method of claim 11, in which each portion of the storage devices used to form the hot data zone comprises a contiguous band of data tracks on an associated rotatable data storage medium accessed by an associated moveable data transducer, each contiguous band corresponding to a selected seek range of the data transducer less than an overall radial width of the storage medium.

19. The method of claim 18, in which the selected seek range of the contiguous band corresponds to about ⅛ of the overall radial width of the storage medium.

20. The method of claim 19, in which the associated memory capacity of each contiguous band corresponds to about 20% of the overall memory capacity of the associated rotatable data storage medium.

\* \* \* \* \*